United States Patent Office 3,756,985
Patented Sept. 4, 1973

3,756,985
PROCESS FOR THE PRODUCTION OF STABLE POLYOXYMETHYLENE COPOLYMERS
Dieter Gerlach, Grossauheim, Erich Bäder, Hanau am Main, and Wolfgang Sibenhorn, Steinheim, Germany, assignors to Deutsche Gold- und Silber-Scheideanstalt vormals Roessler, Frankfurt am Main, Germany
No Drawing. Filed Oct. 16, 1968, Ser. No. 768,196
Claims priority, application Germany, Oct. 19, 1967, P 17 20 509.3
Int. Cl. C08g 1/28
U.S. Cl. 260—67 FP                                    7 Claims

ABSTRACT OF THE DISCLOSURE

Polyoxymethylene copolymers are stabilized against heat and alkali degradation by heating the copolymers in aqueous suspension having non-alkaline pH value.

---

This invention relates to a process for stabilizing polyoxymethylene copolymers and more especially, to stabilizing polyoxymethylene copolymers the main valence chain of which is predominantly made up of oxymethylene units but also contains alkyleneoxy units with at least two adjacent carbon atoms.

Such copolymers contain oxymethylene groupings of semiacetalic structure at the ends of the chains and these groupings are unstable against the effect of heat or alkali.

The improvement of the stability of partially stable formaldehyde polymers through alkaline hydrolysis has been known for a long time in principle. Thus, as early as 1929, unstable polyoxymethylene dihydrates were separated by boiling with diluted alkali from stable polyoxymethylene dimethyl ethers (Staudinger: "The Highly Molecular Compound," 1932, p. 231). Furthermore, it has been known from U.S. Pat. 2,296,249 to remove polymer portions of the paraformaldehyde type, i.e., of low molecular unstable portions, through formaldehyde acceptors, as through aqueous ammonia or formamide. Later these processes were improved by the use of higher temperatures in pressure resistant vessel. Thus, for example, it has been known from French Patent 1,287,151 to remove the unstable portions at the ends of chains through alkaline hydrolysis at temperatures between 90 and 200° C. This process, however, has the disadvantage that the quality of the cracked formaldehyde in the alkaline atmosphere can be impaired, for example, by Cannizzaro reaction, saccharification, etc.

To improve the quality of the polymers, U.S. Pat. 3,225,005 discloses using for the decomposition alkaline reacting substances which act simultaneously as aldehyde acceptors, or a formaldehyde acceptor is also added. Nevertheless, the characteristics of the polymers obtained according to this process are not yet satisfactory.

Accordingly, it is an object of this invention to provide an improved process for stabilizing polyoxymethylene copolymers against heat and alkali degradation.

Another object of this invention is to provide polyoxymethylene copolymers having improved stability against degradation by heat and alkali.

In accomplishing these objects, one feature of this invention resides in stabilizing polyoxymethylene copolymers, which contain in the main valence chain thereof alkyleneoxy units with at least two adjacent carbon atoms, by heating the copolymers in an aqueous suspension having a non-alkaline pH value to thereby remove the unstable chain ends from the copolymers.

Other objects, features and advantages of this present invention will become apparent to those skilled in the art from the detailed description of the invention which follows.

In contrast to the prior art processes discussed above, this invention stabilizes polyoxymethylene copolymers which contain in the main valence chain thereof alkeneoxy groups with at least two adjacent carbon atoms by heating the copolymers in an aqueous suspension while maintaining a non-alkaline pH value to thereby remove unstable chain ends.

Thus the secondary reactions of the formaldehyde in the alkaline area will be eliminated. Under the conditions of the process according to the invention the formaldehyde is stable in the aqueous phase and secondary reactions, as they occur in the case of the processes of the above mentioned patents, do not take place.

At the same time it is surprising that in the case of this treatment in an acid environment at increased temperature, the polyoxymethylenes do not undergo acidolysis, but that only the unstable terminal groups are cracked.

The pH area according to the invention lies in the mildly acid area and should not drop below a pH value of 4, 5. A pH value between 5 and 6, 9 is particularly favorable.

The execution of the process according to the invention takes place in such a manner that the copolymer, comminuted in a known manner or ground and if need be freed of unreacted monomer, is heated to temperatures of 100 to 200° C., preferably 130 to 170 C., while maintaining the mildly acid pH values. Organic solvents and swelling agents, miscible with water as much as possible, can if desired be added to the aqueous suspension.

It is preferred in the case of the process according to the invention to operate under exclusion of oxygen or air. This can be achieved, for example, through displacement of the air by an inert gas, for example, nitrogen, or still more simply by displacement of the air by means of steam. It is also effective to remove the air present in the water that is to be used through first boiling it out.

The pH according to the invention can be adjusted or maintained in a known manner through the addition of an acid reacting substance or through the addition of a suitable buffer. All buffer systems which will guarantee a mildly acid pH value of from 4.5 to 6.9 are usable as buffers. Let us mention by way of example phosphate buffers wth pH values between 4.8 and 6.9. The buffer substance is added effectively in concentrations of 0.1 to 10% by weight, preferably 0.5 to 3%, related to the aqueous phase. The copolymer is suspended in the aqueous phase and, to be sure, advantageously in a quantity of 1 to 50 parts by weight of copolymer in 99 to 50 parts by weight of water. In the case of use of a buffer solution, it is preferred to heat for example a suspension of 20 parts by weight of polymer powder in 80 parts by weight of 0.05 molar buffer solution, for the hydrolytic decomposition of the unstable chain ends.

In the absence of atmospheric oxygen, the required buffer capacity depends on the content of unstable parts of the copolymer. If the copolymers that are to be decomposed contain, for example, less than 5% by weight unstable parts—measured by heating the polymer under nitrogen to 220° C. for four hours and determination of the loss of weight—then, generally, the addition of a buffer may be omitted.

The reaction time in the case of the process according to the invention depends on the temperature and the degree of the desired decomposition. One needs about between two to four hours at a reaction temperature between 135 and 150° C. in order to obtain a copolymer with less than 1% of unstable parts, determinable as stated above.

In order to be able to increase the temperature to close to the softening point, it will be advantageous to also use known suspension stabilizers. Polyvinylpyrrolidone for example is particularly suitable. The suspension stabilizers can be added in concentrations of, for example, 0.2 to 20% by weight related to the aqueous phase.

The decomposition can be accelerated through the addition of known formaldehyde acceptors, such as, for example, formamide. Such formaldehyde acceptors can be added, for example, in quantities of 0.5 to 20% related to the aqueous phase.

The polyoxymethylene copolymers, which are used in the process according to the invention, are of the kind whose polyoxymethylene main chain contains alkyleneoxy units. At the same time the contents of an alkyleneoxy group generally is between 0.1 to 20%, preferably 1.0 to 10% by weight. These copolymers can be produced for example in a known manner, by cationic polymerization of formaldehyde or trioxane in the presence of cyclic ethers of the general formula

in which X is an alkylene group of two to five carbon atoms, or in the presence of cyclic acetals with five to eight ring elements with the help of Lewis acids, such as $BF_3$, $SbF_6$, $SnCl_4$, $FeCl_3$, $PF_5$ or alkyl or acyl perchlorate as disclosed in German Pat. 1,152,818. Preferred comonomers are for example ethylene oxide and other cyclic ethers, as well as cyclic acetals of aliphatic aldehydes and ketones with aliphatic dioles, such as for example cyclic formals of the ethylene glycol, butane-1,4-dioles or of the diethylene glycol.

It will be favorable if the copolymer obtained has a reduced viscosity of more than 0.1, measured in a 0.5% solution of dimethylformamide in the presence of 0.5% diphenylamine.

The process according to the invention is suitable for all of the above mentioned copolymers; it is also well suited for crude polymers which, for example, are still rich in trioxane. Copolymers which are produced with the help of perchlorate catalysts are particularly suited for the process according to the invention.

According to the process of the invention, one will obtain colorless polyoxymethylene copolymers of high stability, which do not change color even in storage. After stabilization with the usual stabilizers known for this purpose, such as, for example, imidazolidone-(2), dicyandiamide, together with 2,2'-methylene-bis-(4-methyl-6-tert.butyl-phenol) as antioxidant, they will suffer, in the case of heating to 220° C. under admission of air, a loss of weight of only 0.005 to 0.020% per minute. They therefore represent valuable raw or industrial materials.

EXAMPLE 1

100 g. of a copolymer, which was produced from 97 parts of trioxane and 3 parts 1,3-dioxepane with the help of tert.butyl perchlorate, in the manner disclosed in German Pat. 1,152,818, is heated in a 2-liter autoclave with 750 ml. of a 5% solution of polyvinylpyrrolidone in water at pH 6.5, for 4 hours to 140°. The air is first displaced by nitrogen. After cooling, the copolymer is filtered off, washed several times with distilled water and dried in the vacuum at 50° for several hours. The product is white.

Table 1 shows the loss of weight after 4 hours of heating of the sample to 220° under nitrogen, which corresponds to the percentual contents of unstable chain ends.

TABLE I

Loss of weight in percent after 4 hours heating under $N_2$ to 220°

| | Percent |
|---|---|
| Untreated sample | 3.7 |
| Sample, decomposed in accordance with the process of the invention | 0.3 |

EXAMPLE 2

100 g. of a copolymer, produced from 97 parts of trioxane and 3 parts 1,3-dioxolane by means of a tert. butyl perchlorate catalyst, analogously to Example 1, are heated in a 2-liter autoclave with 750 ml. of a 0.5% aqueous solution of polyvinyl pyrrolidone at a pH of 6.0, for 4 hours while stirring to 142°. First the air in the autoclave is displaced by nitrogen. After cooling the product is washed as in Example 1 and dried. The stability of the product after heating in a current of nitrogen, compared to a sample which was not subjected to the hydrolytic decomposition, becomes clear from Table II.

TABLE II

Loss of weight in percent after 4 hours heating under $N_2$ to 200°

| | Percent |
|---|---|
| Untreated sample | 2.7 |
| Sample, decomposed in accordance with the process of the invention | 0.2 |

EXAMPLE 3

100 g. of a copolymer, produced from 97 parts by weight of trioxane and 3 parts by weight of 1,3-dioxepane by means of a tert. butyl perchlorate catalyst as in Example 1, are heated in a 2-liter autoclave with 750 ml. of a 5% aqueous suspension of tricalcium phosphate at a pH of 6.5 for 5 hours to 143°. First, the air in the autoclave is displaced by nitrogen. After cooling the product is washed as in Example 1 and dried. The stability of the product, expressed in the percent loss of weight after 4 hours of heating in the nitrogen current to 220° in comparison to a sample, which had not been subjected to the hydrolytic decomposition, becomes clear from Table III.

TABLE III

Loss of weight in percent after 4 hours heating under $N_2$ to 220°

| | Percent |
|---|---|
| Untreated sample | 3.0 |
| Sample, decomposed in accordance with the process according to the invention | 1.5 |

EXAMPLE 4

100 g. of a copolymer, produced from 97 parts of trioxane and 3 parts of 1,3-dioxepane by means of a tert.butyl perchlorate catalyst as in Example 1, are heated in a 2-liter autoclave with 750 ml. of a solution of 1.15% disodium hydrogen phosphate, 0.25% sodium dihydrogen phosphate and 0.5% formamide in water at a pH of 6.9 for 4 hours while stirring to 145°. First the air in the autoclave is displaced by nitrogen. After cooling the product, which is pure white, is washed as in Example 1, and dried. The percent loss of weight after 4 hours of heating in the nitrogen current up to 220°, in comparison to a sample which was not subjected to the hydrolytic decomposition, becomes clear from Table IV.

TABLE IV

Loss of weight in percent after 4 hours heating under $N_2$ to 220°

| | Percent |
|---|---|
| Untreated sample | 5.1 |
| Sample, decomposed in accordance with the process of the invention | 0.6 |

EXAMPLE 5

100 g. of a copolymer, produced from 97 parts by weight of trioxane and 3 parts by weight of 1,3-dioxolane by means of tert. butyl perchlorate catalyst as in Example 2, are heated in a 2-liter autoclave with 750 ml. of a solution of 10% methanol, 1% polyvinylpyrrolidone and 1% formamide in water for 6 hours at 135° and at a pH of 6.5, while stirring. First the air in the autoclave is displaced by nitrogen. After cooling the product, which is white, is washed as in Example 1 and dried. The percent loss of weight after 4 hours of heating in the nitrogen current to 220° in comparison to a sample which was not subjected to the hydrolytic decomposition becomes clear from Table V.

TABLE V

Loss of weight in percent after 4 hours heating under $N_2$ to 220°

|  | Percent |
|---|---|
| Untreated sample | 2.7 |
| Sample, decomposed in accordance with the process of the invention | 0.6 |

EXAMPLE 6

100 g. of a copolymer, produced from 97 parts by weight of trioxane and 3 parts by weight of 1,3-dioxepane by means of a tert. butyl perchlorate catalyst as in Example 1, are heated in a 2 liter autoclave with 750 ml. of a solution of 1% disodium hydrogen phosphate, 0.25% sodium dihydrogen phosphate, 0.5% polyvinylpyrrolidone and 0.5% formamide in water for 4 hours at 145° and at a pH value of 6.5, while stirring. First the air is displaced in the autoclave by nitrogen. After cooling, the product which is white is washed as in Example 1 and dried. The percent loss of weight after 4 hours of heating in the nitrogen current to 220°, in comparison to a sample which has not been subjected to the hydrolysic decomposition, becomes clear from Table VI.

TABLE VI

Loss of weight in percent after 4 hours heating under $N_2$ to 220°

|  | Percent |
|---|---|
| Untreated sample | 3.2 |
| Sample, decomposed in accordance with the process of the invention | 0.7 |

EXAMPLE 7

100 g. of copolymer, produced from 97 parts by weight of trioxane and 3 parts by weight of 1,3-dioxepane by means of tert. butyl perchlorate catalyst as in Example 1, are heated in a 2-liter autoclave with 750 ml. of a solution of 1.15% disodium hydrogen phosphate and 0.25% sodium dihydrogen phosphate in water for 5 hours at 143° and at a pH of 6.9, while stirring. First the air in the autoclave is displaced by nitrogen. Subsequently the product is washed as in Example 1 and dried. The percent loss of weight after 4 hours of heating under $N_2$ to 220° in comparison to a sample which had not been subjected to the hydrolytic decomposition becomes clear from Table VII.

TABLE VII

Loss of weight in percent after 4 hours heating under $N_2$ to 220° C.

|  | Percent |
|---|---|
| Untreated sample | 2.7 |
| Sample, decomposed in accordance with the process of the invention | 0.5 |

EXAMPLE 8

70 g. of a copolymer, produced from 95 parts by weight of trioxane and 5 parts by weight of 1.3-dioxepane by means of a boron fluoride diethyl etherate catalyst are heated in a 1-liter autoclave with 500 ml. of a 1% aqueous solution of polyvinylpyrrolidone for 4 hours at 143° and at a pH value of 5.7, while stirring. First the air is displaced in the autoclave by nitrogen. After cooling the product which is white is washed as in Example 1 and dried.

The percent loss of weight after 4 hours of heating in the nitrogen current to 220° in comparison to a sample which has not been subjected to the hydrolytic decomposition, becomes clear from Table VIII.

TABLE VIII

Loss of weight in percent after 4 hours heating under $N_2$ to 220°

|  | Percent |
|---|---|
| Untreated sample | 3.7 |
| Sample, decomposed in accordance with the process of the invention | 1.0 |

EXAMPLE 9

6 kg. of a copolymer, produced from 97 parts by weight of trioxane and 3 parts by weight of 1.3-dioxepane by means of tert. butyl perchlorate catalyst as in Example 1, are heated in a 50-liter autoclave with 20 kg. of a solution of 40% methanol, 0.092% anhydrous di-sodium hydrogen phosphate, 0.050% sodium dihydrogen phosphate 1-hydrate in water for 1 hour at 138° and at a pH value of 5.9, while stirring. First the air is displaced in the autoclave by nitrogen. After cooling the product, which is white, is filtered off and heated again with 20 kg. water for 30 minutes at 135°. Then it is washed several times with distilled water and dried.

The percent loss of weight after 4 hours of heating in the nitrogen current to 220° in comparison to a sample which has not been subjected to the hydrolytic decomposition, becomes clear from Table IX.

TABLE IX

Loss of weight in percent after 4 hours heating under $N_2$ to 220°

|  | Percent |
|---|---|
| Untreated sample | 3.3 |
| Sample, decomposed in accordance with the process of the invention | 0.8 |

EXAMPLE 10

8 kg. of a copolymer, produced from 97 parts by weight of trioxane and 3 parts by weight of 1.3-dioxepane by means of tert. butyl perchlorate catalyst as in Example 1, are heated in a 100-liter autoclave with 30 kg. of a solution of 60% methanol in water for 2 hours at 140° and at a pH value of 6.0, measured with bromthymol blue as an indicator, while stirring. After cooling the product which is white, is filtered off and heated again with 20 kg. water for 30 minutes at 135°. Subsequently the powder is washed several times with distilled water and dried.

The percent loss of weight after 4 hours of heating in the nitrogen current to 220° in comparison to a sample which has not been subjected to the hydrolytic decomposition, becomes clear from Table X.

TABLE X

Loss of weight in percent after 4 hours heating under nitrogen to 220°

|  | Percent |
|---|---|
| Untreated sample | 6.0 |
| Sample, decomposed in acocrdance with the process of the invention | 0.4 |

EXAMPLE 11

8 kg. of a copolymer, produced from 97 parts by weight of trioxane and 3 parts by weight of 1.3-dioxepane by means of tert. butyl perchlorate catalyst as in Example 1, are heated in a 100-l. autoclave with 36 kg. distilled water for 4 hours at 140° while stirring. The pH value was held between 5.1 and 6.2 by addition of 20 ml. of a solution of 1% sodium carbonate in water in 10 minutes distances of time. After cooling the product, which is white, is filtered off, washed and dried.

The percent loss of weight after 4 hours of heating in the nitrogen current to 220° in comparison to a sample which was not subjected to the hydrolytic decomposition becomes clear from Table XI.

TABLE XI

Loss of weight in percent after 4 hours heating under $N_2$ to 220°

| | Percent |
|---|---|
| Untreated sample | 3.5 |
| Sample, decomposed in accordance with the process of the invention | 1.1 |

EXAMPLE 12

137 kg. of a copolymer, produced from 97% by weight of trioxane and 3% by weight of 1,3-dioxolane by means of a boron trifluoride-diethyl etherate-catalyst, are heated in a 500-liter autoclave with 375 liters of water containing 860 g. disodium hydrogen phosphate, 212 g. sodium dihydrogen phosphate and 1.5 kg. formamide for 4 hours at 143° and at a pH of 6.5, while stirring. First the air in the autoclave is displaced by steam. Subsequently the product is separated and washed in a centrifugal-filter and dried. The percent loss of weight after 4 hours of heating under $N_2$ to 220° in comparison to a sample of the original copolymer is given in Table XII.

TABLE XII

Loss of weight in percent after 4 hours heating under $N_2$ to 220°

| | Percent |
|---|---|
| Untreated sample | 5.3 |
| Sample, decomposed in accordance with the process of the invention | 0.2 |

EXAMPLE 13

100 kg. of a copolymer, prepared from 98% by weight of trioxane and 2% by weight of 1,3-dioxepane in presence of tert. butyl perchlorate, are heated in a 500-liter autoclave with 350 liters of water and 1.5 kg. of formamide for 1 hour at 144° and at a pH of 5.1, while stirring vigorously. First the air in the autoclave is displaced by steam. After the hydrolysis the product is handled as in Example 12. The percent loss of weight after 4 hours of heating in $N_2$-atmosphere to 220° in comparison to an untreated sample of the same material is given in Table XIII.

TABLE XIII

Loss of weight in percent after 4 hours heating under $N_2$ to 220°

| | Percent |
|---|---|
| Untreated sample | 5.5 |
| Sample, decomposed in accordance with the process of the invention | 1.8 |

While there have been described and pointed out the fundamental novel features of the invention as applied to the preferred embodiment, it will be understood that various omissions and substitutions and changes in the details of the process may be made by those skilled in the art without departing from the spirit of the invention. It is the intention, therefore, to be limited only as indicated by the scope of the following claims.

What is claimed is:

1. In a process for stabilizing polyoxymethylene copolymers, which contain in the main valence chain thereof alkyleneoxy units with at least two adjacent carbon atoms by heating the copolymers in an aqueous suspension to thereby remove the unstable chain ends from said copolymers, the improvement comprising carrying out the heating step in an aqueous suspension having a pH value within the acid range but not lower than 4.5.

2. Process according to claim 1 wherein said heating is performed in the absence of oxygen.

3. Process according to claim 1 wherein said aqueous suspension contains a buffer which maintains the pH thereof between 4.5 and 6.9.

4. Process according to claim 1 wherein said heating is at a temperature of 100 to 200° C. and under elevated pressure.

5. Process according to claim 1 wherein said aqueous suspension contains a suspension stabilizer.

6. Process according to claim 1 wherein said aqueous suspension contains a formaldehyde acceptor.

7. Process according to claim 1 wherein said polyoxymethylene copolymers with alkyleneoxy units are cationic polymerization products of trioxane and (a) cyclic ethers of the general formula

wherein X is an alkylene group of two to five carbon atoms, or (b) cyclic acetals with five to eight ring elements of which at least 2 represent oxygen atoms.

References Cited

UNITED STATES PATENTS

| | | | |
|---|---|---|---|
| 2,989,509 | 6/1961 | Hudgin et al. | 260—67 FP |
| 3,174,948 | 3/1965 | Wall et al. | 260—67 FP |
| 3,122,525 | 2/1964 | Kern et al. | 260—67 |
| 3,225,005 | 12/1965 | Asmus et al. | 260—67 |
| 3,428,605 | 2/1969 | Smith et al. | 260—67 |

WILLIAM H. SHORT, Primary Examiner

L. M. PHYNES, Assistant Examiner